US008175787B2

(12) United States Patent
Rogers et al.

(10) Patent No.: US 8,175,787 B2
(45) Date of Patent: May 8, 2012

(54) ELECTRICAL FUEL TRANSFER PUMP DIAGNOSTIC

(75) Inventors: Gary L. Rogers, Davison, MI (US); Zhong Wang, Bellevue, WA (US); Michael A. Turley, Dexter, MI (US); Scott A. Kegebein, Brighton, MI (US)

(73) Assignee: GM Global Technology Operations LLC

( * ) Notice: Subject to any disclaimer, the term of this patent is extended or adjusted under 35 U.S.C. 154(b) by 602 days.

(21) Appl. No.: 12/333,640

(22) Filed: Dec. 12, 2008

(65) Prior Publication Data

US 2009/0306873 A1 Dec. 10, 2009

Related U.S. Application Data

(60) Provisional application No. 61/058,653, filed on Jun. 4, 2008.

(51) Int. Cl.

| | |
|---|---|
| ***G06F 19/00*** | (2011.01) |
| ***G06G 7/70*** | (2006.01) |
| ***F02M 57/02*** | (2006.01) |
| ***E03B 11/00*** | (2006.01) |
| ***F17D 1/00*** | (2006.01) |
| ***F04B 49/00*** | (2006.01) |

(52) U.S. Cl. ........... 701/101; 123/446; 137/571; 417/36

(58) Field of Classification Search .................. 123/446, 123/510, 495, 514, 515, 516; 701/101; 137/1, 137/571, 395, 398, 399, 409, 565.01, 565.11; 244/135 C; 417/36, 313
See application file for complete search history.

(56) References Cited

U.S. PATENT DOCUMENTS

| | | | | |
|---|---|---|---|---|
| 5,201,294 | A * | 4/1993 | Osuka | 123/458 |
| 2001/0035215 | A1* | 11/2001 | Tipton et al. | 137/571 |
| 2004/0149271 | A1* | 8/2004 | Wiesenberger et al. | 123/509 |
| 2006/0190149 | A1* | 8/2006 | LaPant | 701/30 |
| 2006/0254342 | A1* | 11/2006 | Ito et al. | 73/49.2 |

* cited by examiner

*Primary Examiner* — Stephen K Cronin
*Assistant Examiner* — Sizo Vilakazi

(57) ABSTRACT

An engine control system having primary and secondary fuel tanks comprises a fuel monitoring module and a transfer pump (TP) diagnostic module. The fuel monitoring module determines a measured fuel level of the secondary fuel tank based on a fuel level signal received from a fuel level sensor when a fuel TP is on for greater than a predetermined time period required for the fuel TP to reduce the measured fuel level from a predetermined fuel level to below the predetermined fuel level. The TP diagnostic module diagnoses a condition of the fuel TP based on the measured fuel level.

20 Claims, 4 Drawing Sheets

ELECTRICAL FUEL TRANSFER PUMP DIAGNOSTIC

CROSS-REFERENCE TO RELATED APPLICATIONS

This application claims the benefit of U.S. Provisional Application No. 61/058,653, filed on Jun. 4, 2008. The disclosure of the above application is incorporated herein by reference.

FIELD

The present disclosure relates to fuel systems, and more particularly to systems and methods for diagnosing electrical fuel transfer pumps of fuel systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustions engines combust an air and fuel mixture within cylinders to produce drive torque. More specifically, the combustion events reciprocally drive pistons that drive a crankshaft to provide torque output from the engine. The fuel is delivered to the engine by a fuel system. The fuel systems of some vehicles include a plurality of fuel tanks. For example, some fuel systems include a primary fuel tank and a secondary fuel tank that share a common filling neck.

Fuel levels within the fuel tanks are monitored, and the vehicle operator is informed of the amount of fuel remaining in each tank. More specifically, a fuel level sensor is provided in each tank. Each fuel level sensor is responsive to the fuel level in a respective tank and generates a signal based on the fuel level. The amount of fuel remaining is determined based on the signal.

Some fuel systems further include a transfer pump (TP) that supplies fuel drawn from the primary fuel tank to the secondary fuel tank. Conventional TP diagnostic systems do not diagnose the TP when the secondary fuel tank is full. Further, vehicle operators may regularly fill the secondary fuel tank to full, and thus, the diagnostic systems may never detect a failed TP.

SUMMARY

An engine control system having primary and secondary fuel tanks comprises a fuel monitoring module and a transfer pump (TP) diagnostic module. The fuel monitoring module determines a measured fuel level of the secondary fuel tank based on a fuel level signal received from a fuel level sensor when a fuel TP is on for greater than a predetermined time period required for the fuel TP to reduce the measured fuel level from a predetermined fuel level to below the predetermined fuel level. The TP diagnostic module diagnoses a condition of the fuel TP based on the measured fuel level.

A method of operating an engine control system having primary and secondary fuel tanks comprises determining a measured fuel level of the secondary fuel tank based on a fuel level signal received from a fuel level sensor when a fuel transfer pump (TP) is on for greater than a predetermined time period required for the fuel TP to reduce the measured fuel level from a predetermined fuel level to below the predetermined fuel level; and diagnosing a condition of the fuel TP based on the measured fuel level.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
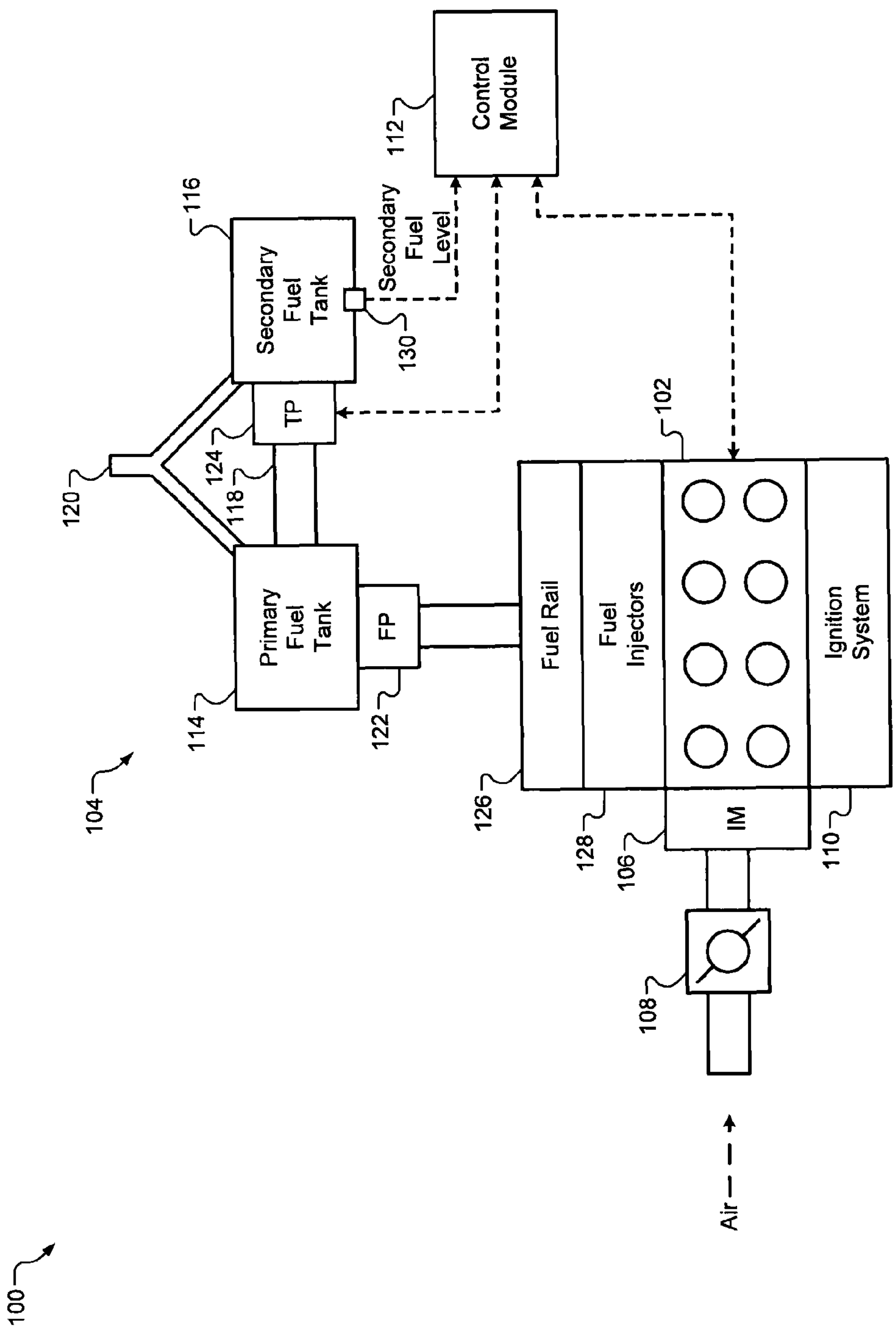
FIG. 1 is a functional block diagram of an exemplary implementation of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system of the present disclosure includes a transfer pump (TP) diagnostic system that diagnoses a fuel TP based on a fuel level of a secondary fuel tank. The fuel TP is diagnosed when the fuel TP is on for greater than a predetermined time period required for the fuel TP to reduce the fuel level from a full fuel level to below the full fuel level. The fuel TP is diagnosed to have failed when the fuel level is greater than or equal to the full fuel level. The fuel TP is diagnosed to be operating correctly when the fuel level is less than the full fuel level and when an initial fuel level of the secondary fuel tank is greater than or equal to the full fuel level.

Referring now to FIG. 1, a functional block diagram of an exemplary implementation of an engine system 100 is presented. The engine system 100 includes an engine 102, a fuel system 104, an intake manifold (IM) 106, a throttle 108, an ignition system 110, and a control module 112. The fuel system 104 includes a primary fuel tank 114, a secondary fuel tank 116, a balance pipe 118, a fueling neck 120, a fuel pump (FP) 122, a transfer pump (TP) 124, a fuel rail 126, fuel injectors 128, and a secondary fuel sensor 130.

The primary fuel tank 114 is connected to the secondary fuel tank 116 by the balance pipe 118. The balance pipe 118 prevents the primary fuel tank 114 from overflowing during refueling and may balance the amount of fuel between the fuel tanks 114, 116. The fuel tanks 114, 116 may receive fuels of varied composition, such as fuels with varying percentages of ethanol. During a refueling event, fuel is fed to the fuel tanks 114, 116 simultaneously via the fueling neck 120.

For example only, the FP 122 and the TP 124 may be fixed displacement pumps or variable displacement pumps. The FP 122 provides fuel drawn from the primary fuel tank 114 to the fuel rail 126. As the fuel injectors 128 inject fuel drawn from the fuel rail 126 into cylinders of the engine 102, the FP 122 replenishes the fuel within the fuel rail 126.

The TP 124 provides fuel drawn from the secondary fuel tank 116 to the primary fuel tank 114 when the primary fuel tank 114 has a primary fuel level that is below a predetermined fuel level (i.e., a control fuel level). The TP 124 stops providing the fuel to the primary fuel tank 114 when the primary fuel level is above a predetermined fuel level that is greater than the control fuel level and indicative of a full state (i.e., a primary full fuel level). In addition, the TP 124 stops providing the fuel when the secondary fuel tank 116 has a secondary fuel level that is below a predetermined fuel level that is indicative of an empty state (i.e., an empty fuel level).

The secondary fuel sensor 130 senses the secondary fuel level and generates a secondary fuel signal based on the secondary fuel level. In various embodiments, the secondary fuel sensor 130 may include a component such as a "float" that is buoyant and that floats at a surface of the secondary fuel tank 116. The secondary fuel sensor 130 may generate the secondary fuel signal based on the position of the float within the secondary fuel tank 116.

Air is drawn into the IM 106 through the throttle 108 and distributed into the cylinders of the engine 102. The air mixes with fuel in the cylinders to form a combustion mixture that is compressed and ignited by the ignition system 110 to reciprocally drive pistons (not shown) within the cylinders. The pistons drive a crankshaft (not shown) of the engine 102 to provide a drive torque output.

The control module 112 communicates with the engine 102, the TP 124, and the secondary fuel sensor 130. The control module 112 monitors and controls the engine 102, including monitoring an engine on status and an engine idle status. The control module 112 monitors and controls the TP 124, including monitoring a TP control status and a TP on status. The TP control status indicates whether control of the TP 124 has been requested by another device of the engine system 100. The control module 112 receives the secondary fuel level from the secondary fuel sensor 130.

Figure 2:
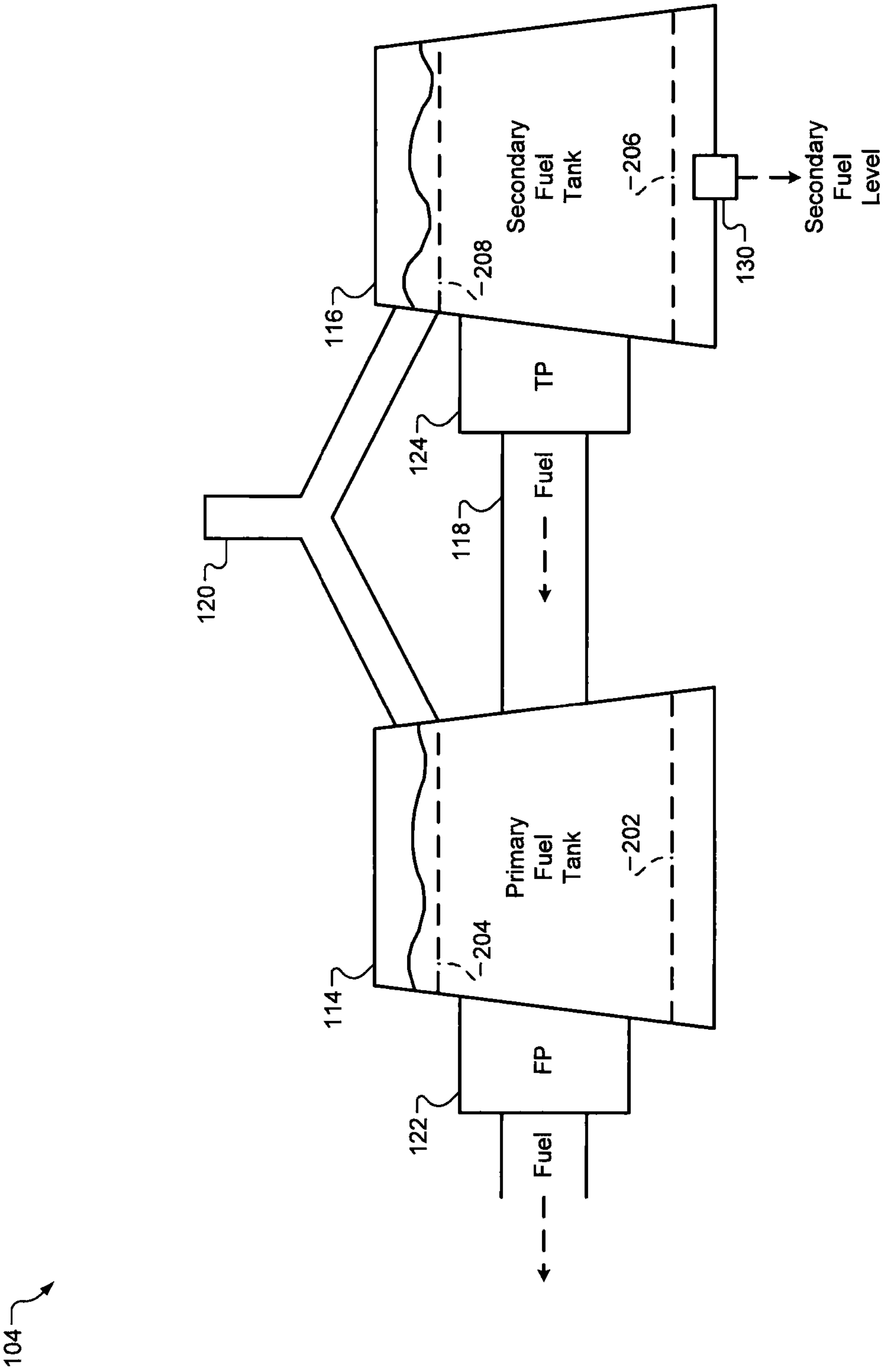
FIG. 2 is a functional block diagram of an exemplary implementation of a fuel system according to the principles of the present disclosure.

Referring now to FIG. 2, a functional block diagram of an exemplary implementation of the fuel system 104 is presented. The TP 124 supplies the fuel drawn from the secondary fuel tank 116 to the primary fuel tank 114 when the primary fuel level is below a control fuel level 202. The TP 124 stops supplying the fuel to the primary fuel tank 114 when the primary fuel level is above a primary full fuel level 204 and/or when the secondary fuel level is below an empty fuel level 206. The secondary fuel tank 116 further includes a predetermined fuel level that is indicative of a full state of the secondary fuel tank 116 (i.e., a secondary full fuel level 208).

Figure 3:
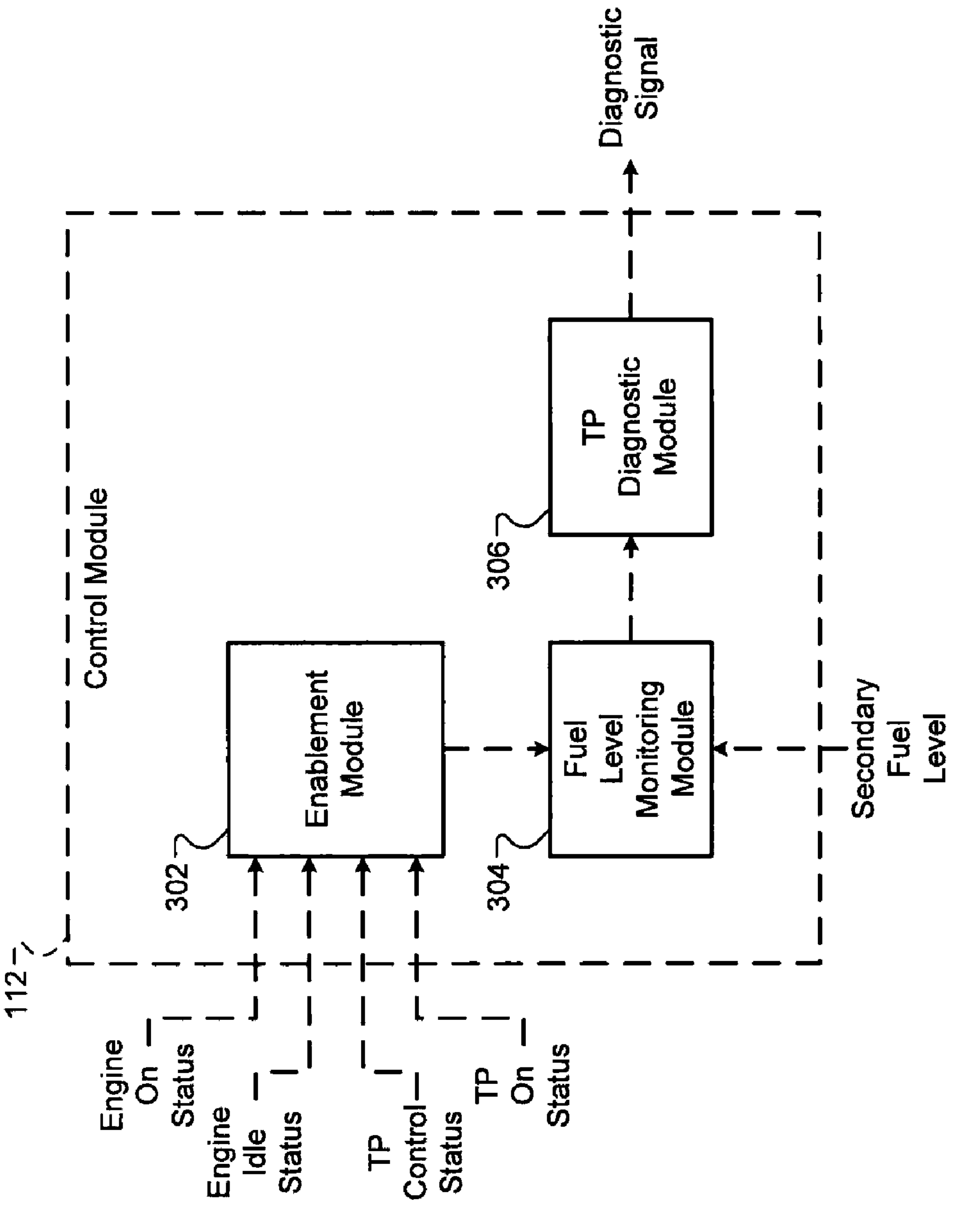
FIG. 3 is a functional block diagram of an exemplary implementation of a control module according to the principles of the present disclosure.

Referring now to FIG. 3, a functional block diagram of an exemplary implementation of the control module 112 is presented. The control module 112 includes an enablement module 302, a fuel level monitoring module 304, and a TP diagnostic module 306. The enablement module 302 determines whether to enable the fuel level monitoring module 304 by verifying that no active faults exist that may impact proper operation of the fuel level monitoring module 304. The active faults may include, but are not limited to, component diagnostic trouble codes, fuel level sensor out-of-range codes, and vehicle speed fault codes.

If no active faults exist, the enablement module 302 receives the TP control status from the TP 124. The enablement module 302 determines whether to enable the fuel level monitoring module 304 further based on the TP control status. If the TP control status indicates that control of the TP 124 has not been requested by another device of the engine system 100, the enablement module 302 receives the engine on status from the engine 102. The enablement module 302 determines whether to enable the fuel level monitoring module 304 further based on the engine on status.

If the engine on status indicates that the engine 102 is on, the enablement module 302 receives the TP on status from the TP 124. The enablement module 302 includes a TP on timer (not shown) that is initialized to zero and that begins to increment when the TP 124 is commanded on. If the TP on status indicates that the TP 124 is on, the enablement module 302 determines a TP on time period based on the TP on timer.

If the engine on status indicates that the engine 102 is on, the enablement module 302 receives the engine idle status from the engine 102. The enablement module 302 determines whether to enable the fuel level monitoring module 304 further based on the engine idle status. The enablement module 302 includes a fuel slosh delay timer (not shown) that is initialized to zero and that begins to increment when the engine 102 is at idle.

At idle, the movement of the fuel in the secondary fuel tank 116 begins to stabilize, and the fuel slosh delay timer measures the time period from when the movement of the fuel begins to stabilize. If the engine idle status indicates that the engine 102 is not at idle, the enablement module 302 resets the fuel slosh delay timer to zero. If the engine idle status indicates that the engine 102 is at idle, the enablement module 302 determines a fuel slosh delay time period based on the fuel slosh delay timer.

The enablement module 302 determines whether to enable the fuel level monitoring module 304 further based on the fuel slosh delay time period and a fuel stable time period. The fuel stable time period is a predetermined time period that indicates a stable state of the movement of the fuel in the secondary fuel tank 116. The enablement module 302 determines the fuel slosh delay time period until the fuel slosh delay time period is greater than or equal to the fuel stable time period.

The enablement module 302 determines whether to enable the fuel level monitoring module 304 further based on the TP on time period and a fuel transfer time period. The fuel transfer time period is a predetermined time period required for the TP 124 to reduce the secondary fuel level from the secondary full fuel level to below the secondary full fuel level. If the TP on time period is greater than or equal to the fuel transfer time period, the enablement module 302 enables the fuel level monitoring module 304.

The fuel level monitoring module 304 receives the secondary fuel level and determines whether the secondary fuel level is greater than or equal to the secondary full fuel level. The TP diagnostic module 306 communicates with the fuel level monitoring module 304. If the secondary fuel level is greater than or equal to the secondary full fuel level, the TP diagnostic module 306 sets a diagnostic signal to a fail signal. The fail signal indicates that the TP 124 has failed.

If the secondary fuel level is less than the secondary full fuel level, the fuel level monitoring module 304 retrieves an initial secondary fuel level from memory. When the engine 102 is initially turned on, the enablement module 302 enables the fuel level monitoring module 304 to determine the initial secondary fuel level based on the secondary fuel signal. The fuel level monitoring module 304 stores the initial secondary fuel level in memory.

The fuel level monitoring module 304 determines whether the initial secondary fuel level is greater than or equal to the secondary full fuel level. If the initial secondary fuel level is greater than or equal to the secondary full fuel level, the TP diagnostic module 306 sets the diagnostic signal to a pass signal. The pass signal indicates that the TP 124 is performing correctly.

Figure 4:
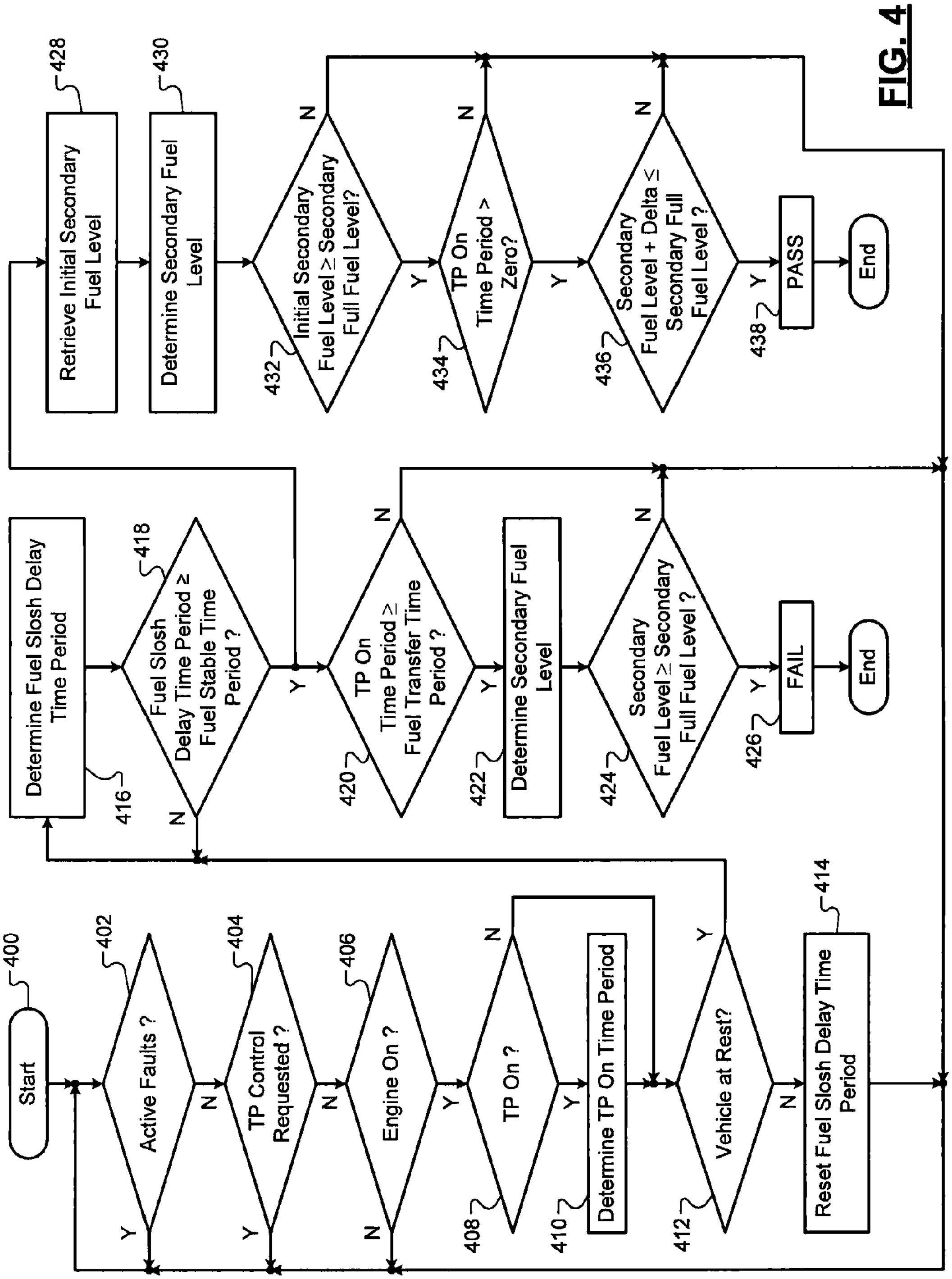
FIG. 4 is a flowchart depicting exemplary steps performed by the control module according to the principles of the present disclosure.

Referring now to FIG. 4, a flowchart depicting exemplary steps performed by the control module 112 begins in step 400. In step 402, the control module 112 determines whether the active faults exist. If yes, control returns to step 402. If no, control proceeds to step 404.

In step 404, the control module 112 determines whether the TP control status indicates that control of the TP 124 has been requested. If yes, control returns to step 402. If no, control proceeds to step 406. In step 406, the control module 112 determines whether the engine on status indicates that the engine 102 is on. If no, control returns to step 402. If yes, control proceeds to step 408.

In step 408, the control module 112 determines whether the TP on status indicates that the TP 124 is on. If no, control proceeds to step 412. If yes, control proceeds to step 410. In step 410, the control module 112 determines the TP on time period. In step 412, the control module 112 determines whether the vehicle is at rest. For example, the control module 112 may check the engine idle status and/or the vehicle speed. If yes, control proceeds to step 416. If no, control proceeds to step 414. In step 414, the control module 112 resets the fuel slosh delay time period to zero, and control returns to step 402.

In step 416, the control module 112 determines the fuel slosh delay time period. In step 418, the control module 112 determines whether the fuel slosh delay time period is greater than or equal to the fuel stable time period. If no, control returns to step 416. If yes, control proceeds to steps 420 and 428.

In step 420, the control module 112 determines whether the TP on time period is greater than or equal to the fuel transfer time period. If no, control returns to step 402. If yes, control proceeds to step 422. In step 422, the control module 112 determines the secondary fuel level 130. In step 424, the control module 112 determines whether the secondary fuel level 130 is greater than or equal to the secondary full fuel level 208. If no, control returns to step 402. If yes, control proceeds to step 426. In step 426, the control module 112 sets the diagnostic signal (i.e., Diagnostic) to the fail signal (i.e., Fail) and control ends.

In step 428, the control module 112 retrieves the initial secondary fuel level. In step 430, the control module 112 determines the secondary fuel level. In step 432, the control module 112 determines whether the initial secondary fuel level is greater than or equal to the secondary full fuel level 208. If no, control returns to step 402. If yes, control proceeds to step 434. In step 434, the control module 112 determines whether the TP on time is greater than zero. If no, control returns to step 402. If yes, control proceeds to step 436.

In step 436, the control module 112 determines whether the secondary fuel level 130 plus a calibration amount of fuel (i.e. Delta) is less than or equal to the secondary full fuel level 208. For example, the control module 112 could command the TP 124 to pump the calibration amount of fuel from the secondary fuel tank 116 to the primary fuel tank 114. In other words, the control module 112 may check to see whether the TP 124 is functioning properly based on whether it performed the requested pumping operation. If no, control returns to step 402. If yes, control proceeds to step 438. In step 438, the control module 112 sets the diagnostic signal to the pass signal (i.e., Pass) and control ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system having primary and secondary fuel tanks, comprising:

a fuel monitoring module configured to determines a measured fuel level of the secondary fuel tank based on a fuel level signal received from a fuel level sensor when a fuel transfer pump (TP) is on for greater than a predetermined time period required for the fuel TP to reduce the measured fuel level from a predetermined fuel level to below the predetermined fuel level;

an enablement module configured to enable the fuel monitoring module when an engine is at idle and to disable the fuel monitoring module when the engine is not at idle; and a TP diagnostic module configured to diagnose a condition of the fuel TP based on the measured fuel level.

2. The engine control system of claim 1 wherein the enablement module is further configured to enable the fuel monitoring module in an absence of active faults, wherein the active faults include at least one of component diagnostic trouble codes, fuel level sensor out of range codes, and vehicle speed fault codes.

3. The engine control system of claim 1 wherein the enablement module is further configured to enable the fuel monitoring module in an absence of a request for control of the fuel TP by another device.

4. The engine control system of claim 1 wherein the enablement module comprises a timer, wherein the enablement module is further configured to determine an idle time period based on the timer when the engine is at idle, and wherein the enablement module is further configured to enable the fuel monitoring module when the idle time period is greater than a predetermined time period that indicates a stable state of movement of fuel in the secondary fuel tank.

5. The engine control system of claim 1 wherein the TP diagnostic module is further configured to signal a fail state of the fuel TP when the measured fuel level is greater than or equal to the predetermined fuel level.

6. The engine control system of claim 1 wherein the TP diagnostic module is further configured to signal a pass state of the fuel TP when the measured fuel level is less than the predetermined fuel level and when an initial fuel level of the secondary fuel tank is greater than or equal to the predetermined fuel level.

7. The engine control system of claim 6 wherein the fuel monitoring module is further configured to determine the initial fuel level based on the fuel level signal when the engine is initially turned on.

8. A method of operating an engine control system having primary and secondary fuel tanks, comprising:

determining a measured fuel level of the secondary fuel tank based on a fuel level signal received from a fuel level sensor when a fuel transfer pump (TP) is on for greater than a predetermined time period required for the fuel TP to reduce the measured fuel level from a predetermined fuel level to below the predetermined fuel level;

enabling the determining of the measured fuel level when an engine is at idle and disabling the determining of the measured fuel level when the engine is not at idle: and diagnosing a condition of the fuel TP based on the measured fuel level.

9. The method of claim 8 further comprising enabling the determining of the measured fuel level in an absence of active faults, wherein the active faults include at least one of component diagnostic trouble codes, fuel level sensor out of range codes, and vehicle speed fault codes.

10. The method of claim 8 further comprising enabling the determining of the measured fuel level in an absence of a request for control of the fuel TP by another device.

11. The method of claim 8 wherein enabling the determining of the measured fuel level includes determining an idle time period based on a timer when the engine is at idle, and wherein determining the measured fuel level includes determining the measured fuel level when the idle time period is greater than a predetermined time period that indicates a stable state of movement of fuel in the secondary fuel tank.

12. The method of claim 8 further comprising signaling a fail state of the fuel TP when the measured fuel level is greater than or equal to the predetermined fuel level.

13. The method of claim 8 further comprising signaling a pass state of the fuel TP when the measured fuel level is less than the predetermined fuel level and when an initial fuel level of the secondary fuel tank is greater than or equal to the predetermined fuel level.

14. The method of claim 13 further comprising determining the initial fuel level based on the fuel level signal when the engine is initially turned on.

15. A control system for an engine including a primary fuel tank, a secondary fuel tank, and a transfer pump that selectively pumps fuel from the secondary fuel tank to the primary fuel tank, the control system comprising:

a first module configured to, when enabled, (i) determine whether a fuel slosh timer has expired, the fuel slosh timer indicating a period for fuel levels in the primary and secondary fuel tanks to stabilize, (ii) when the fuel slosh timer has expired, determine whether the transfer pump has been on for a first predetermined period, and (iii) when the transfer pump has been on for the first predetermined period, measure the fuel level in the secondary fuel tank during a second predetermined period;

a second module configured to enable the first module when the transfer pump is on, the engine is at idle, and the secondary fuel tank is full; and a third module configured to determine a pass/fail status of the transfer pump based on whether the measured fuel level in the secondary fuel tank is less than a predetermined level after the second predetermined period.

16. The control system of claim 15, wherein the second module is further configured to command the transfer pump on when the transfer pump is off, the engine is at idle, and the secondary fuel tank is full.

17. The control system of claim 15, wherein the second module is further configured to enable the first module when the primary fuel tank is not full.

18. The control system of claim 15, wherein the second module is further configured to reset the fuel slosh timer when the engine is not at idle.

19. The control system of claim 15, wherein the second module is further configure to disable the first module when a diagnostic trouble code is present than can affect the pass/fail status determination by the third module or when the transfer pump is being commanded by another system associated with the engine.

20. The control system of claim 15, wherein the second module is further configured to disable the first module when the engine is not at idle.

* * * * *